United States Patent
Mishra

(10) Patent No.: US 9,961,637 B2
(45) Date of Patent: May 1, 2018

(54) METHOD FOR CONTROLLING ENERGY CONSUMPTION AND USER DEVICE

(71) Applicant: Nokia Solutions and Networks Oy, Espoo (FI)

(72) Inventor: Abhishek Mishra, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 4 days.

(21) Appl. No.: 14/763,850

(22) PCT Filed: Jan. 31, 2013

(86) PCT No.: PCT/EP2013/051911
§ 371 (c)(1),
(2) Date: Jul. 28, 2015

(87) PCT Pub. No.: WO2014/117845
PCT Pub. Date: Aug. 7, 2014

(65) Prior Publication Data
US 2015/0373645 A1   Dec. 24, 2015

(51) Int. Cl.
*H04W 52/02* (2009.01)
*H04L 29/06* (2006.01)
*H04L 29/08* (2006.01)

(52) U.S. Cl.
CPC ..... *H04W 52/0222* (2013.01); *H04L 65/4069* (2013.01); *H04L 67/145* (2013.01); *H04W 52/0212* (2013.01); *Y02B 60/50* (2013.01)

(58) Field of Classification Search
None
See application file for complete search history.

(56) References Cited

U.S. PATENT DOCUMENTS

| 2004/0082353 A1* | 4/2004 | Kekki | H04W 52/54 455/522 |
| 2006/0215685 A1* | 9/2006 | Capone | H04Q 3/0025 370/438 |

(Continued)

FOREIGN PATENT DOCUMENTS

WO   WO 2012/059125 A1   5/2012

OTHER PUBLICATIONS

ETSI TR 123 919 V7.0.0 (Jun. 2007); Digital cellular telecommunications system (Phase 2+); Universal Mobile Telecommunications System (UMTS); Direct tunnel deployment guideline (3GPP TR 23.919 version 7.0.0 Release 7).

(Continued)

*Primary Examiner* — Steven H Nguyen
(74) *Attorney, Agent, or Firm* — Harrington & Smith

(57) ABSTRACT

The present invention relates to networks and provides a method and network devices for energy conservation. The method may include detecting media traffic and media management traffic of a first service requested by a user device on a first bearer; segregating the media traffic and the media management traffic on the first bearer by creating a second bearer and transferring the media traffic or the media management traffic to the second bearer. Moreover, the method may include observing the bearer at which the media traffic was transferred, detecting that the media traffic has an inactive status and controlling the energy consumption at the user device based on the inactive status of the media traffic.

18 Claims, 15 Drawing Sheets

(56) References Cited

U.S. PATENT DOCUMENTS

| | | | | |
|---|---|---|---|---|
| 2007/0259673 | A1* | 11/2007 | Willars | H04W 52/0225 455/453 |
| 2009/0016282 | A1* | 1/2009 | Gasparroni | H04L 45/24 370/329 |
| 2009/0232019 | A1 | 9/2009 | Gupta et al. | 370/252 |
| 2011/0058523 | A1* | 3/2011 | Manning | H04W 28/16 370/329 |
| 2012/0120815 | A1* | 5/2012 | Anderson | H04W 76/048 370/252 |
| 2013/0170350 | A1* | 7/2013 | Sarkar | H04W 28/24 370/235 |
| 2014/0064156 | A1* | 3/2014 | Paladugu | H04W 28/0268 370/259 |
| 2015/0098332 | A1* | 4/2015 | Eriksson | H04L 47/14 370/235 |

OTHER PUBLICATIONS

ETSI TS 123 002 V8.7.0 (Jan. 2011); Digital cellular telecommunications system (Phase 2+); Universal Mobile Telecommunications System (UMTS); LTE; Network architecture (3GPP TS 23.002 version 8.7.0 Release 8).

ETSI TS 123 060 V10.3.0 (Mar. 2011); Digital cellular telecommunications system (Phase 2+); Universal Mobile Telecommunications System (UMTS); General Packet Radio Service (GPRS); Service description; Stage 2 (3GPP TS 23.060 version 10.3.0 Release 10).

ETSI TS 123 203 V11.7.0 (Nov. 2012); Digital cellular telecommunications system (Phase 2+); Universal Mobile Telecommunications System (UMTS); LTE; Policy and charging control architecture (3GPP TS 23.203 version 11.7.0 Release 11).

ETSI TS 124 008 V11.4.0 (Oct. 2012); Digital cellular telecommunications system (Phase 2+); Universal Mobile Telecommunications System (UMTS); LTE; Mobile radio interface Layer 3 specification; Core network protocols; Stage 3 (3GPP TS 24.008 version 11.4.0 Release 11).

ETSI TS 129 212 V9.2.0 (Apr. 2010); Universal Mobile Telecommunications System (UMTS); LTE; Policy and charging control over Gx reference point (3GPP TS 29.212 version 9.2.0 Release 9).

ETSI TS 129 213 V9.4.1 (Oct. 2010); Digital cellular telecommunications system (Phase 2+); Universal Mobile Telecommunications System (UMTS); LTE; Policy and charging control signalling flows and Quality of Service (QoS) parameter mapping (3GPP TS 29.213 version 9.4.1 Release 9).

ETSI TS 129 214 V10.2.0 (Apr. 2011); Universal Mobile Telecommunications System (UMTS); LTE; Policy and charging control over Rx reference point (3GPP TS 29.214 version 10.2.0 Release 10).

RFC 5761; C. Perkins, et al.; "Multiplexing RTP Data and Control Packets on a Single Port"; Internet Engineering Task Force (IETF); Apr. 2010.

RFC 6263; X. Marjou, et al.; "Application Mechanism for Keeping Alive the NAT Mappings Associated with RTP / RTP Control Protocol (RTCP) Flows"; Internet Engineering Task Force (IETF); Jun. 2011.

Holmberg, C., "Indication of Support for Keep-Alive", Internet Engineering Task Force (IETF), Apr. 2011, Ericsson, 18 pgs.

Rosenberg, J., "Interactive Connectivity Establishment (ICE): A Protocol for Network Address Translator (NAT) Traversal for Offer/Answer Protocols", Internet Engineering Task Force (IETF), Apr. 2010, 117 pgs.

3GPP TS 29.214 V11.7.0 (Dec. 2012), "3$^{rd}$ Generation Partnership Project; Technical Specification Group Core Network and Terminals; Policy and Charging Control over Rx reference point (Release 11)", 53 pgs.

TS 23.060v10.0.0: "General Packet Radio Service (GPRS) enhancements", 3GPP, 2010 TS 23.203 V11.0.0 (release-11), Technical Specification Group Services and System Aspects, Policy and charging control architecture, 3GPP, 2011 at https://portal.3gpp.org/desktopmodules/Specifications/SpecificationDetails.aspx?specificationId=758.

TS 23.203 V11.0.0 (release-11), Technical Specification Group Services and System Aspects, Policy and charging control architecture, 3GPP, 2011 at https://portal.3gpp.org/desktopmodules/Specifications/SpecificationDetails.aspx?specificationId=810.

TS 24.008 V 11.0.0, "Mobile Radio Interface Layer 3 Specification", 3GPP 2012 at https://portal.3gpp.org/desktopmodules/Specifications/SnecificationDetails.aspx?specificationId=1015.

TS 29.214 V10.0.1 (release-10) "3rd Generation Partnership Project; Technical Specification Group Core Network and Terminals; Policy and Charging Control over Rx Interface", 3GPP, 2010 at https://.portal.3gpp.org/desktopmodules/Specifications/SpecificationDetails.aspx?specificationId=1674.

* cited by examiner

METHOD FOR CONTROLLING ENERGY CONSUMPTION AND USER DEVICE

TECHNICAL FIELD

The invention relates to communication networks. Embodiments of the present invention relate generally to mobile communications and more particularly to network devices and methods in communication networks. In particular, the invention relates to a method, to a network device and a network system for energy conservation in a communication network. Moreover, the present invention relates to a computer program product and a computer-readable medium.

BACKGROUND

Networks are based on architectures which are under development. 3GPP is one group which develops networks worldwide and provides standards for communication networks and devices for these networks. Modern real-time application services may be used at present to enable different traditional real services on the mobile phone. These real-time applications services are for example voice over IP communication, such as provided by Skype. These services are in general application layer driven. A 3G network which may be used to connect the mobile devices may remain unaware of the real-time data transmission going on this device and may behave as a typical pipe. This may be due to the following characteristics of such services:

Firstly, the application may decide which protocol to be used for sending the real-time data, on the bearer, for example Real Time Protocol (RTP). Secondly, the application may take care of connection management on the bearer, for example keep alive behaviour.

The core network where a packet data protocol context (PDP context) is set up may remain unaware of the time, when the RTP data is flowing and when the connection management messages, like keep alive behaviour data, is flowing on the same bearer. Hence, during real-time traffic, a network server may not get a chance to invoke the energy conserving procedures defined by 3GPP.

With the advances in the mobile network, a user can have a TV (television) like reception on its mobile phone. These mobile phones or end devices strive hard to conserve its energy while supporting such reception. The modern real-time application services uses application level protocols like RTSP (Real Time Streaming Protocol), XML (eXtended Markup Language), etc, to deliver the connectivity, which may be above the transport and L2 protocols. Even the media (e.g. RTP and media management (like keep-alive) are application level defined.

Modern real time applications on handsets use application layer keep-alive messages to prevent the connections from closure, when traffic is not flowing (e.g. due to silence). For example, 3GPP (3rd Generation Partnership Project) recommends the use of ICE (Interactive Connectivity Establishment) in IMS (IP-Multimedia Subsystem) networks, while, HTTP (Hyper Text Transfer Protocol) Websocket based communications recommends, ping for keep-alive. This creates an issue with the handset in executing the power conservation schemes as the keep-alive and media travel on the same TFT (Traffic Flow Template). In such a case, the end device may remain unaware of the media transmission type and is unable to trigger the standard conservation procedures.

There are known protocols defined for real-time communication for keep-alive behaviour. One of these protocols is for example the mechanism defined in IETF RFC 6223 and IETF RFC 5245, where the STUN keep-alive package (STUN=Session Traversal Utilities for NAT) may be exchanged whenever there is a silence detected. This is to do the nut connections active in case a silence is detected for traffic. In such cases, the TFT (Traffic Flow Template) for keep-alive behaviour and media "be the same", as the five tuples of TFT are the same. The five tuples of TFT may include source-IP, source-port, destination IP, destination port and transport protocol, such as UDP. Therefore, media and keep-alive parameters may be in this case travelling on the same PDP context, since the TFT are the same in this case. Therefore, the device will not get a chance to invoke energy conservation schemes.

Furthermore, it has to be taken into account the multiple PDP contexts created for a real-time data transmission. Due to guidelines of standardization documents, a lot of bearer may be created on a mobile phone, which may drain out the energy for such a device, even though the device is not having active traffic. In such cases, the policy control framework may comprise a PCRF (Policy and Charging Rule Function) and GGSN (Gateway GPRS Support Node) combination. Such a policy control framework may play a role on when enabling the energy preservation scheme on the mobile phone. This policy may help in saving a high amount of battery life for the mobile device.

3GPP provides mobile network architectures of the third generation with radio access based on UMTS and further optimizations comprising technologies of HSPA. Further evolutions of networks are introduced with 3GPP release 8 TS23.002, which comprises a new type of radio access called LTE (Long Term Evolution). Architectural changes also have been specified for the mobile core network named EPC (Evolved Packet Core) which may connect mobile users apart from LTE via legacy 3GPP radio access or even non-3GPP accesses, such as WLAN.

Multimedia streaming in public land mobile networks (PLMN) may be one focus of 3GPP standardization. The evolved packet core is a part of the core network, which was introduced in 3GPP release 8 and later. However, the EPC also considers earlier 3GPP releases, for example release 4 to 7, where operator managed application is controlled by the IP multimedia subsystem (IMS). The IMS may interact with a policy control function (PCRF) to influence resource allocation for a UMTS bearer service. Examples for multimedia streaming applications are video call and IP-TV. At present the usage of smart phones and tablet PCs simulate a significant increased usage of multimedia streaming applications in PLMNs.

It is known, that applications managed within IMS may control access to resources via a PCRF. However, no mechanisms may be known for non-IMS controlled applications in order to influence resource allocation in PLMN fourth generation networks, such as EPC. From the third generation networks (GPRS) it is known in order to reserve resources for an application, that the client may request per media the setup of a secondary PDP context with the appropriate bit rate. In LTE technology the network may establish a dedicated bearer per media via application function without any involvement of the application client. The request may be mapped by the PCRF to policy rules in order to map media session information to concrete QoS parameters for the bearer service. For example, for streaming communication services like video calls, a QoS class identifier (QCI) of value "2" or of value "4" with guaranteed bit rate service (GBR) may be used. Also for IMS controlled IP-TV the QCI of value "4" may be utilized but dependent on a policy of the operator non-GBR classes could be used, for example dependent on a subscriber profile. Other alternatives are the detection of the application via traffic detection function (TDF), which may utilize deep packet inspection functionality (DPI). The TDF may inform the PCRF about detected applications, then the PCRF may update policies in the gateway and the gateway may for example trigger the establishment of a dedicated bearer.

However, the current streaming service do neither support a SIP based interface to the IMS nor act as IMS application servers supporting an Rx-interface. An Rx-interface is understood as an interface between an AF (Application Function) and a PCRF. It may be diameter based and explained in 3GPP defined in document TS 29.214. At the moment there is no interaction between applications and networks. In case of congestion the rate can not be adapted so far. Thus, at current streaming services are offered via non-GBR bearers and thus can be impacted by high cell load.

There may be a need for mechanisms to manage an increased usage of multimedia streaming applications efficiently.

SUMMARY

According to an exemplary embodiment of the present invention there is provided a method for controlling energy consumption comprising detecting media traffic and media management traffic of a first service requested by a user device on a first bearer; segregating the media traffic and the media management traffic of the first bearer by creating a second bearer and transferring the media traffic or the media management traffic to the second bearer. Moreover, the method includes observing the bearer at which the media traffic was transferred, detecting that the media traffic has an inactive status and controlling the energy consumption at the user device based on the inactive status of the media traffic.

The method may be applicable as a real time data transmission. Moreover, there may be media traffic and media management traffic present on an application level. The media traffic may comprise RTP data. Furthermore, the user device may be a target device for consuming multi-media applications.

Several embodiments of the present invention may provide post connection set-up scenarios and may handle non-SIP like messages (example keep-alive) which may be used for managing the sockets and may be therefore understood as media management. In addition to this, it may be understood that "Media Control" is referred to control signaling messages like SIP messages which may be used to setup a call.

According to an exemplary embodiment of the present invention the method may further comprise detecting that the media traffic is requested again by the user device and reactivating the flow of the media traffic on the bearer where that media traffic was in an inactive status.

According to an exemplary embodiment of the present invention the method may further comprise detecting media traffic and media management traffic of a second service on a third bearer requested by a user device and segregating the media traffic and the media management traffic of the third bearer by using a further or already established bearer, where already media management traffic is present and transferring the media management traffic of this service to that bearer.

According to an exemplary embodiment of the present invention the method may further comprise detecting the first service and/or the second service within a common IP-CAN session.

This means that the services may be present together within one IP-CAN session, which may be understood as the common IP-CAN session.

According to an exemplary embodiment of the present invention it may be further provided, that the media management traffic comprises keep alive data.

According to an exemplary embodiment of the present invention the method may further comprise sending a trigger information in an uplink direction for indicating a silence detected.

According to an exemplary embodiment of the present invention it may be further provided, that the first service is provided on a primary packet data protocol (PDP) context and the second service is provided on a secondary packet data protocol (PDP) context.

In this context "primary" and "secondary" does not include a hierarchy, it means that there is one service and a further service.

According to an exemplary embodiment of the present invention there may be provided a network element for controlling energy conservation comprising an entity for detecting media traffic and media management traffic on a first bearer requested by a user device, an entity for segregating the media traffic and the media management traffic on the first bearer by activating a second bearer and transferring the media traffic or the media traffic to the second bearer. The network element may further comprise an entity for observing the bearer, where the media traffic is present, an entity for detecting if the media traffic has an inactive status, and an entity for controlling the energy consumption at the user device based on the inactive status of the media traffic.

A network element may be for example a base station, a node of a network, a gateway or a server installed within the network.

According to an exemplary embodiment of the present invention the network element may be a GGSN network element or a combination of a GGSN network element combined with a PCRF network element.

According to an exemplary embodiment of the present invention there may be provided a user device, which may be controllable in relation to energy conservation. The user device or terminal device may comprise an entity for receiving media traffic and media management traffic on a first bearer requested by the user device, an entity for receiving segregated media traffic and media management traffic on two different bearers, an entity for terminating a request of media traffic to have an inactive status and an entity for receiving control parameters controlling the energy consumption at the user device based on the inactive status of the media traffic.

According to an exemplary embodiment of the present invention there may be provided a network system comprising a network element according to the present invention and a user device according to the present invention.

According to an exemplary embodiment of the present invention there may be provided a computer program product comprising code portions for causing a network device, on which the computer program is executed, to carry out the method according to the present invention.

According to an exemplary embodiment of the present invention there may be provided a computer-readable medium embodying the computer program product according to the present invention.

Modern real time applications use keep-alive messages to prevent the connections from closure, when traffic is not flowing (e.g. due to silence). For example, 3GPP recommends the use of ICE in IMS networks, while, HTTP Websocket based communications recommends, ping for keep-alive. This creates an issue with the handset in executing the power conservation schemes as the keep-alive and media travel on the same TFT.

Therefore, it is provided a solution for enabling the energy conservation on the mobile devices or UE (User Equipment) for the cases, where peers trigger keep alive when the media is not traversed which may prohibit the device to invoke the power conservation techniques. In the first step, the Ag-PCRF and Ag-GGSN combination segregates the media and keep-alive packets on different bearers.

After that, the PDP context preservation procedures are invoked so that the contexts on which traffic is not being observed for a long time can be preserved. This helps in reducing the PDP contexts on the device in cases when media is not observed. Once, the media is observed, the PDP contexts are brought to the active state. The approach helps in conserving energy on the target devices.

A quality of service (QoS) may be understood as a collective effect of service performance, which may determine a degree of satisfaction of a service user. The quality of service may be characterized by combined aspects of performance factors applicable to all services, such as service operability performance, service accessibility performance, service retainability performance, service integrity performance and other factors specific to each service.

A quality of user experience (QoE) may be related to the quality of service (QoS), but may differ in that while the quality of service may attempt to objectively measure the service, the quality of user experience may be subjective. QoS for managing traffic flow in the core network may be utilized.

The proposed approach could be implemented in the following situations:

Firstly, modern real-time application services, (like a Skype server) can be used to enable different traditional real-time services on the mobile phone. These services are often application layer driven. The 3G network which is used to connect the mobile devices remains unaware of the real-time data transmission going on it and behaves as a typical pipe. This is due to the following characteristics of such services:

The application may decide which protocol to be used for sending the real-time data (e.g. RTP) on the bearer. Moreover, the application may take care of connection management (e.g. Keep Alive) on the bearer.

The core network where the PDP (Packet Data Protocol) context is setup may remain unaware, of the time, when the RTP data is flowing and when the connection management messages (like keep alive) data is flowing on the same bearer. Hence, during real time traffic, a network may not get any chance to invoke the energy conserving procedures defined by the 3GPP.

There are certain protocols defined for real time communication for keep alive. One such mechanism is IETF RFC 6223 and IETF RFC 5245, where the STUN (Session Traversal Utilities for NAT) keep-alive packets are exchanged whenever there is a silence detected. This is to do the NAT connections active in case a silence is detected for traffic.

In such cases, the TFT (traffic flow template) for keep-alive and media would be "same", as the five tuples of TFT (source-IP, source-Port, destination-IP, destination-port and transport-protocol (e.g. UDP)) are same.

Hence, media and keep-alive would be in this case travelling on the same PDP context (as the TFT are same in this case), due to which the device would never get a chance to invoke energy conservation schemes.

Secondly, another situation for applying the approach could be the multiple PDP contexts created for a real-time data transmission. Due to standard's guideline (e.g. bearer of QCI=1 (QoS Class Identifier) for Voice and bearer of QCI=6 for Gaming, a lot of bearers are created on a handset, which drains out the energy for a 3G device, even though they are not having active media traffic. Media traffic could be caused for example by a video streaming, a call or browsing in the internet.

It is proposed that, the policy control framework comprising of PCRF (Policy and Charging Rule Function) and GGSN (Gateway GPRS Support Node) combination, can play a role on when to enable the energy preservation scheme on the UE. This will help in saving battery life of the mobile device or UE or user device, which terms may be used in an exchangeable way within this context. Such device may include a mobile phone or a cell phone, a tablet, a portable computer device and every mobile device, which is suitable to use media data.

The solution presented enables the energy conservation on the mobile devices for the cases, where peers trigger keep alive when the media is not traversed which may prohibit the device to invoke the power conservation techniques.

According to an exemplary embodiment of the present invention it may be provided, that the control of energy consumption is provided for uplink traffic or for downlink traffic or for a combination of uplink traffic and downlink traffic.

It may be foreseen for the downlink traffic on the downlink (Network to UE direction):

In the first step, the PCRF and GGSN combination may segregate the media and keep-alive packets of a given service on different bearers. After that, the PDP context preservation procedures are invoked so that the contexts on which traffic is not being observed for a long time can be preserved. This may cause a reduction of the PDP contexts on the device in cases when media is not observed. Once, the media is observed, the PDP contexts may be brought to the active state. This may help in conserving energy on the target devices.

During the PDP context creation or update, the Ag-PCRF may pass the charging-rule-install comprising the information about the rules, TFT and bearer to the Ag-GGSN. So, in downlink direction (i.e. Ag-GGSN to UE direction), the Ag-GGSN may segregate the packets based on the rules. Hence, the packets having the same TFT can be sent on different bearers.

To handle the uplink direction (i.e. UE to Ag-GGSN direction), the following may be used:

On getting the charging-rule-install from the Ag-PCRF, the Ag-GGSN may set the "Protocol configuration option" field with "media-only" towards the access. Furthermore, the Ag-GGSN may send another modify message for the Primary PDP context (or any other bearer) with the rules "Protocol configuration option" field with "Keep alive" towards the access. The access may read the "protocol configuration option" provided from the core and store may store it. At the UE, the PDCP stack for the PDP contexts may use the information present in the RoHC (e.g. if media like RTP is in use) and match it with the protocol configuration option provided. So, at the uplink, the PDP context may be able to route the only the required data. If this context is preserved, then from the UE side, it may be only required to be activated when there is a media flow. The other packets like keep alive may go on the different bearer like on the primary PDP context.

Moreover, it may be foreseen for the uplink traffic on the uplink (UE to Network direction):

On getting the charging-rule-install from the PCRF, the GGSN may set the "Protocol configuration option" field with "media-only" towards the access. Furthermore, the GGSN may send another modify message for the Primary PDP context (or any other bearer) with the rules "Protocol configuration option" field with "Keep alive" towards the access. Moreover, the access may read the "protocol configuration option" provided from the core and store it.

At the UE, the PDCP (Packet Data Convergence Protocol) stack for the PDP contexts may use the information present in the RoHC [Robust Header Compression] (e.g. if media like RTP is in use) and may match that information with the protocol configuration option provided. Thus, at the uplink, the PDP context may be able to route the only the required data. If this context is preserved, then from the UE side, it would be only required to be activated when there is a media flow. The other packets like keep alive may go on the different bearer like on the primary PDP context.

BRIEF DESCRIPTION OF DRAWINGS

Embodiments of the present invention are described below with reference to the accompanying drawings, which are not necessarily drawn in scale, wherein.

DETAILED DESCRIPTION OF EXEMPLARY EMBODIMENTS

Figure 1:
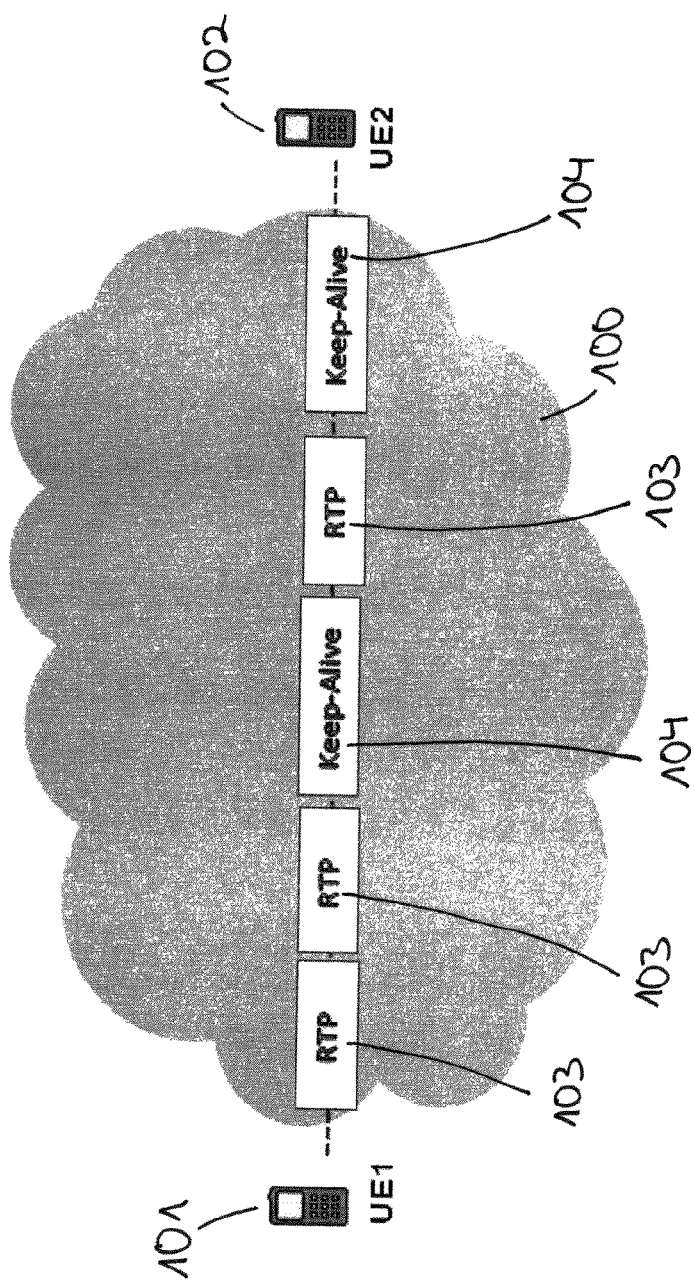
FIG. 1 illustrates an exemplary embodiment of a peer-to-peer connection.

The illustration of the drawings is schematic. In different drawings, similar or identical elements are provided with the same reference numerals.

In order to describe examples of the present invention in more detail, two exemplary scenarios are considered. A first exemplary scenario illustrates a scenario where an SIP-based application is used, wherein their media (RTP) and keep-alive (STUN/ICE) are used in FIGS. 2, 3, 4, 5 and 7. The second exemplary case according to FIGS. 8, 9, 10 and 11 is provided by an http-web socket-based application in use.

FIG. 1 illustrates an exemplary embodiment of a peer-to-peer connection 100. A first user equipment (UE) 101 is connected to a second user equipment (UE) 102 over the peer-to-peer connection 100. On the peer-to-peer connection 100 an application level media, such as RTP 103 and an application level media control traffic is flowing 104, such as keep-alive data. In other words, between the two UE 101, 102 different real-time data transmissions are provided including RTP and keep-alive data, which are flowing on an application level, respectively.

Figure 2:
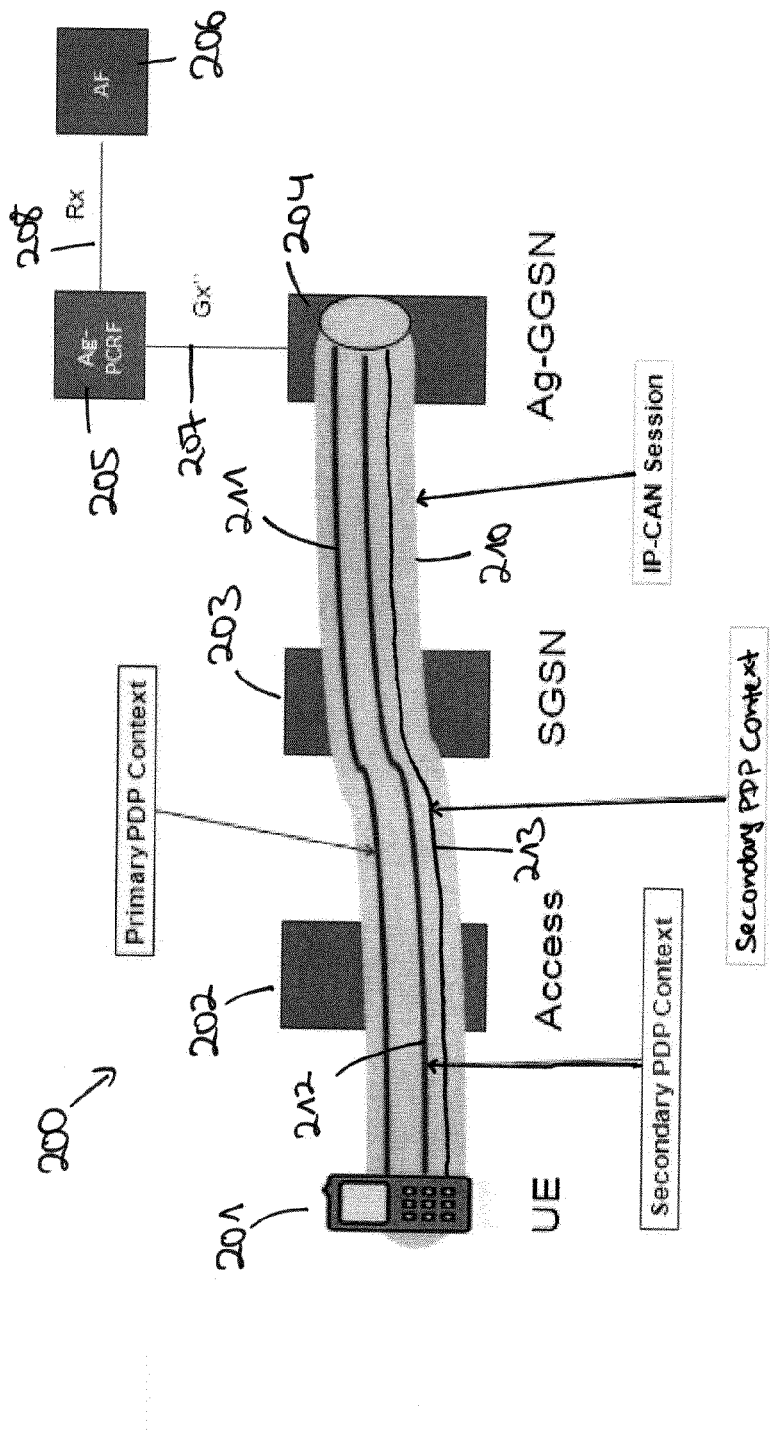
FIG. 2 illustrates an exemplary embodiment of a setup of a network.

FIG. 2 shows an exemplary setup of a network 200 with an UE 201 (User Equipment), an access 202, a SGSN 203 (Serving GPRS Support Node), an Ag-GGSN 204 (Agile-Gateway GPRS Support Node), an Ag-PCRF 205 (Agile-Policy Charging and Rule Function) and an AF 206 (Application Function). The UE 201 is connected to the GGSN 204, over the access 202 and the SGSN 203. The GGSN 204 comprises special features in accordance with embodiments of the present invention and is called in this context "agile-GGSN" (Ag-GGSN). Furthermore, the PCRF 205 also comprises special features in accordance with embodiments of the present invention and is called "agile PCRF" (Ag-PCRF). Within the network 200 of FIG. 2 the Ag-GGSN 204 is connected with the Ag-PCRF 205 over a Gx-interface 207. The Ag-PCRF 205 is connected with the AF 206 via an Rx interface 208. The Ag-GGSN 204 shown in the Figures may be understood as Policy and Charging Enforcement Function (PCEF). In general the PCEF may be installed in the Gateways, e.g. here in the Ag-GGSN 204, which may implement the rules provided by the Ag-PCRF 205.

The UE 201 is using a primary PDP context 211, a first secondary PDP context 212 and a second secondary PDP context 213, all included within an IP-CAN session 210 (IP-CAN=IP Connectivity Access Network). Thus, the UE 201 is using multiple PDP contexts 211, 212, 212 for different services within a present IP-CAN session 210.

The network architecture shown in FIG. 2 illustrates the first exemplary scenario, where an SIP-based application, media, such as RTP and keep-alive (STUN/ICE) are used. In FIG. 2 a video session is provided for the user UE 201, wherein at the application level a keep-alive mechanism is implemented by STUN and ICE. In IP based setups, where NAT boxes are used between two peers, a technique called as Interactive Connectivity Establishment (ICE) may be used for discovery of public IP-Address of the UE. ICE uses STUN (Session Traversal Utilities for NAT) protocol for the discovery. As an application of ICE/STUN, RFC 6223 has recommended to use ICE/STUN for keep-alive checks for real time traffic, so that the pin-hole opened for media traversal is not closed, when there is no media happening due to a pause or the latency of the media.

Figure 3:
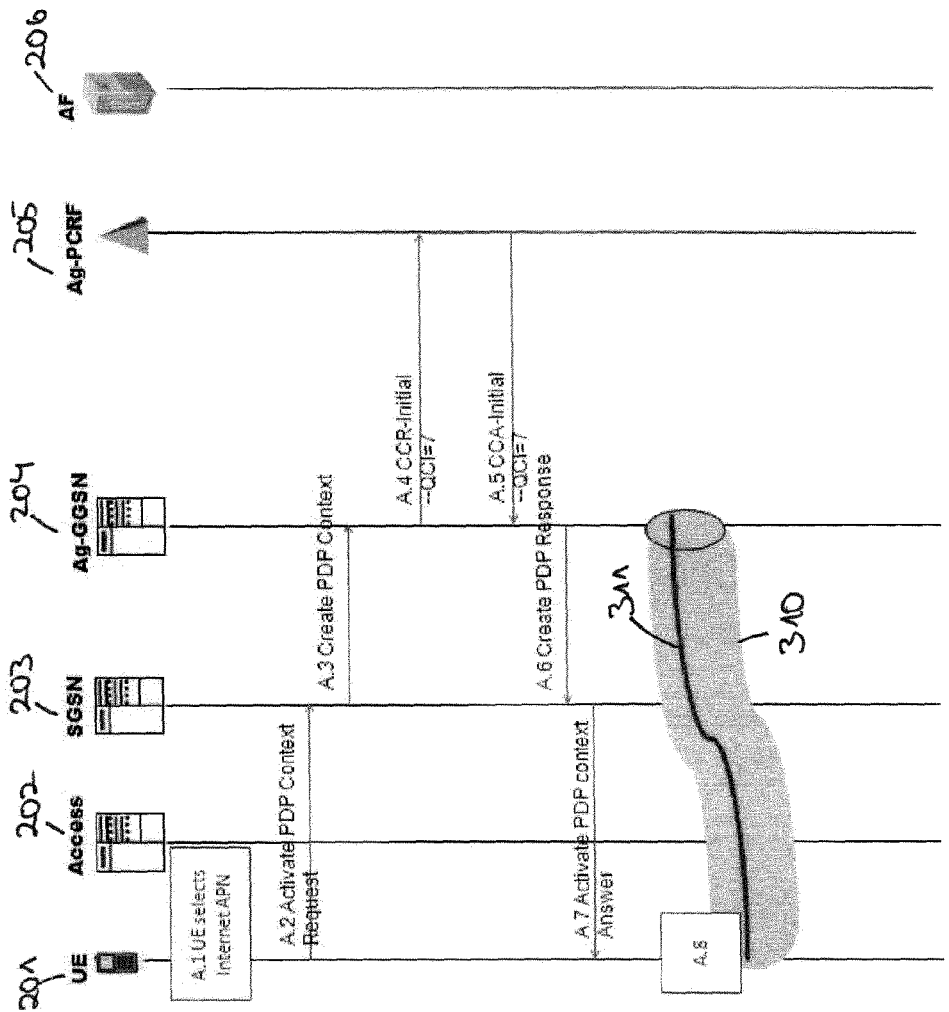
FIG. 3 illustrates an exemplary embodiment of a primary PDP context setup.
Figure 4:
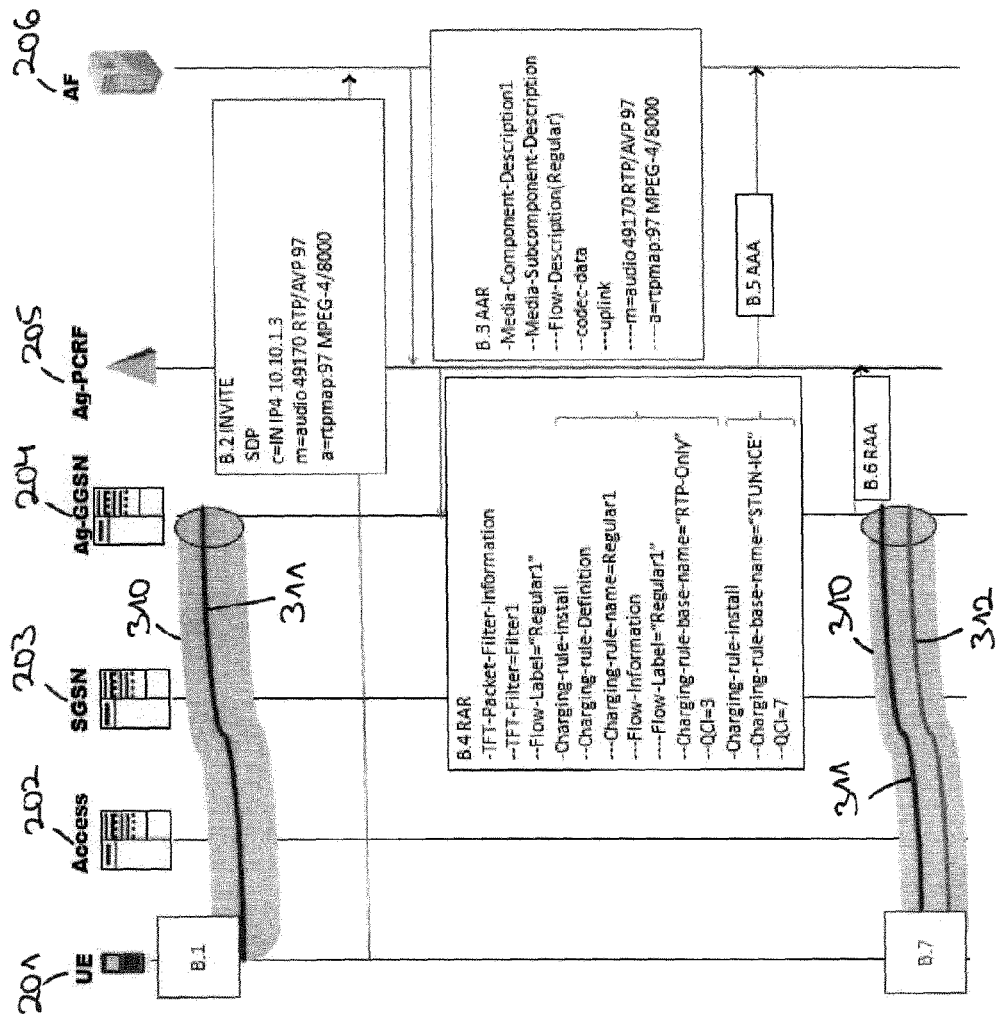
FIG. 4 illustrates an exemplary embodiment of a secondary PDP context setup.

In FIG. 3 and FIG. 4, the scenario of FIG. 2 is further illustrated in more detail. FIG. 3 shows a flow diagram with the primary PDP context setup between the UE 201 and the Ag-GGSN 204. FIG. 4 shows a flow diagram with the secondary PDP context setup comprising the media and keep-alive segregation procedure according to the first exemplary scenario based on the setup of FIG. 2. In the flow diagrams there are shown boxes indicating information and data streams with arrows indicating a data flow direction between the UE 201 and a network device or between network devices.

In box A.1 the UE 201 selects an internet APN. The flow A.2 from the UE 201 to the SGSN 203 indicates a request by the UE 201 for Activate PDP Context. In A.3 the SGSN 203 sends a message comprising create PDP Context request to the Ag-GGSN 204. In A.4 a CCR-Initial is sent from the Ag-GGSN 204 to the Ag-PCRF 205. In A.5 the Ag-PCRF 205 installs the rules for QCI=7. This is done by sending the Credit Control Answer (CCA) message, comprising the charging-rule-install AVP with the charging-rule-name and QoS. At A.6 the Ag-GGSN 204 sends the Create PDP response to the SGSN 203. In A.7 the SGSN 203 sends the Active PDP Context answer to the UE 201. In box A.8 the primary PDP context is created with QCI=7 at the UE 201 and an IP-CAN session 310 is established between the UE 201 and the Ag-GGSN 204 comprising a first PDP context 311.

The secondary PDP context setup as illustrated in FIG. 4 starts with the IP-CAN session 310 of FIG. 3 and establishes later on in this IP-CAN session 310 a second PDP context 312.

Box B.1 indicates that the UE 201 has the created IP-CAN session 310 with the primary PDP context 311. With flow B.2 the UE 201 sends an INVITE message comprising a SDP information to the AF 206. The content of the message is indicated in box B.2. In flow B.3 an Rx-AAR message is sent with codec-data within a Media Component Description. The Codec-Data AVP may comprise the uplink/downlink codec information containing the media, codec-format and codec-description. Box B.3 indicates the content of the message sent from the AF 206 to the Ag-PCRF 205. In flow B.4 the Ag-PCRF 205 sends the Gx-RAR message comprising a "TFT-Packet Filter Information" to the Ag-GGSN 204. The created TFT-Packet Filter Information is created after bifurcating the service, wherein the bifurcating of the service may be performed by sending the pre-defined rules for "RTP-Only" and "STUN-ICE-Only" on QCI for Voice and QCI for default bearer respectively. In order to do so, the Ag-PCRF 205 instructs the Ag-GGSN 204 with the pre-defined rules ("RTP-Only" and "STUN-ICE-Only") on a respective QCI. The Ag-GGSN 204 allows the RTP packets on a new secondary PDP context 312, while the keep-alive (STUN/ICE) is sent on the primary PDP context 311. The content of the message of flow B.4 is indicated in box B.4. In flow B.5 the Ag-PCRF 205 sends the Rx-AAA content to the AF 206. In flow B.6 the Ag-GGSN 204 sends the Gx-RAA content to the Ag-PCRF 205. In box B.7 the Ag-GGSN 204 creates the secondary PDP 312 with QCI=3. Moreover, the Ag-GGSN 204 ensures that the RTP flows on the secondary bearer and the "Keep-alive" on the QCI=7.

Figure 5:
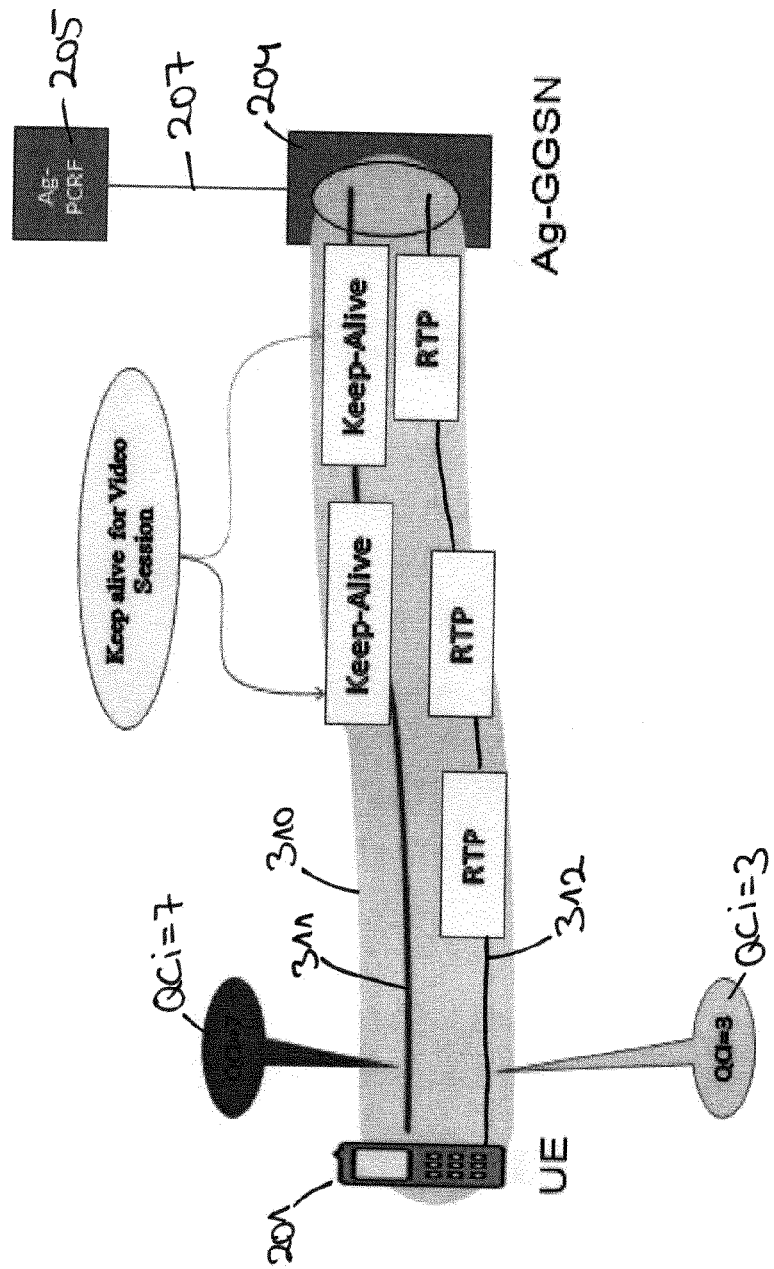
FIG. 5 illustrates an exemplary segregation of traffic.

FIG. 5 illustrates an exemplary segregation of traffic of the IP-CAN session 310 as shown in FIG. 4. The UE 201 is connected to the Ag-GGSN 204. The IP-CAN session 310 comprises the first PDP context 311 and the second PDP context 312. The first PDP context 311 comprises Keep-Alive data and the second PDP context 312 comprises RTP data. Thus, a segregation of the traffic takes place for different contexts transmitted. After the traffic is segregated, the Ag-PCRF 205 and Ag-GGSN 204 may invoke the energy conservation procedures by preserving the PDP contexts on which traffic is not present.

Figure 6:
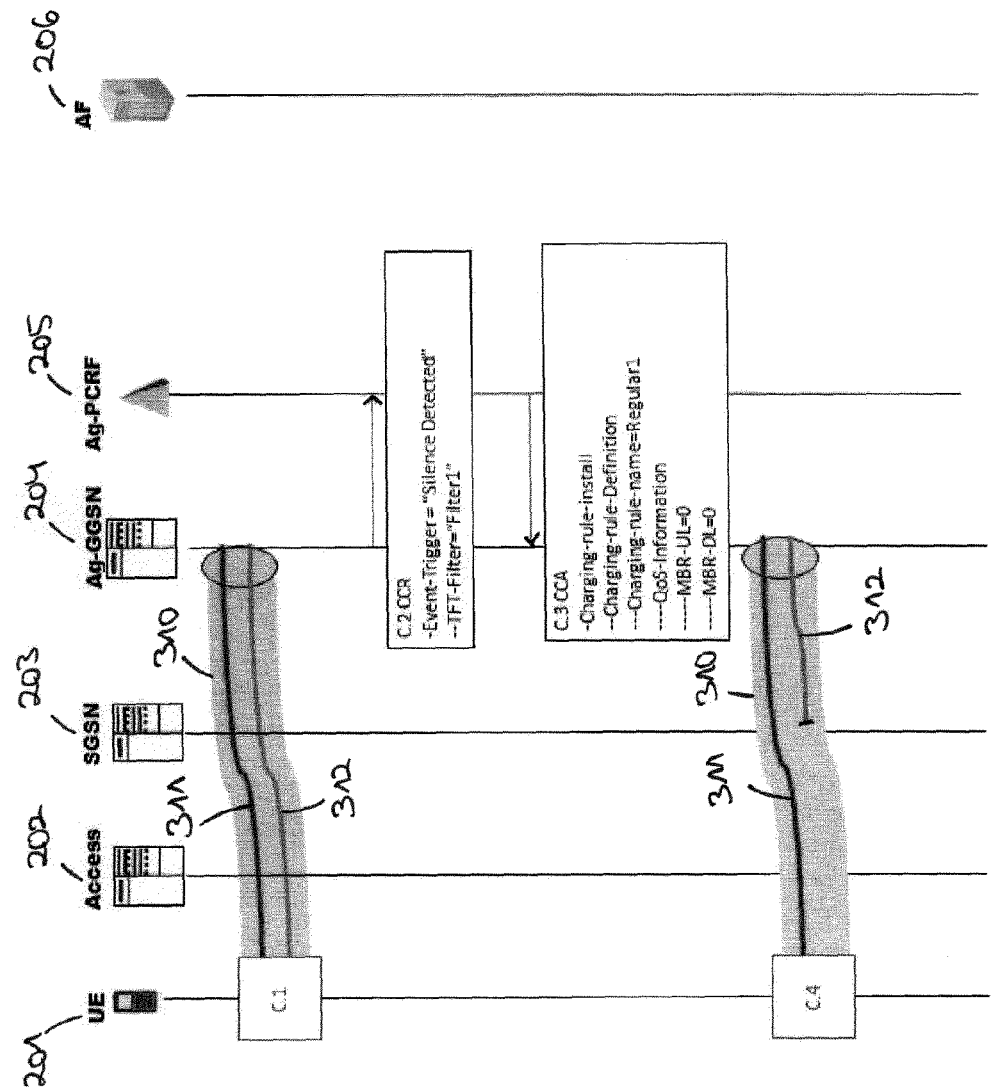
FIG. 6 illustrates an exemplary embodiment of an invocation for a context preservation.
Figure 7:
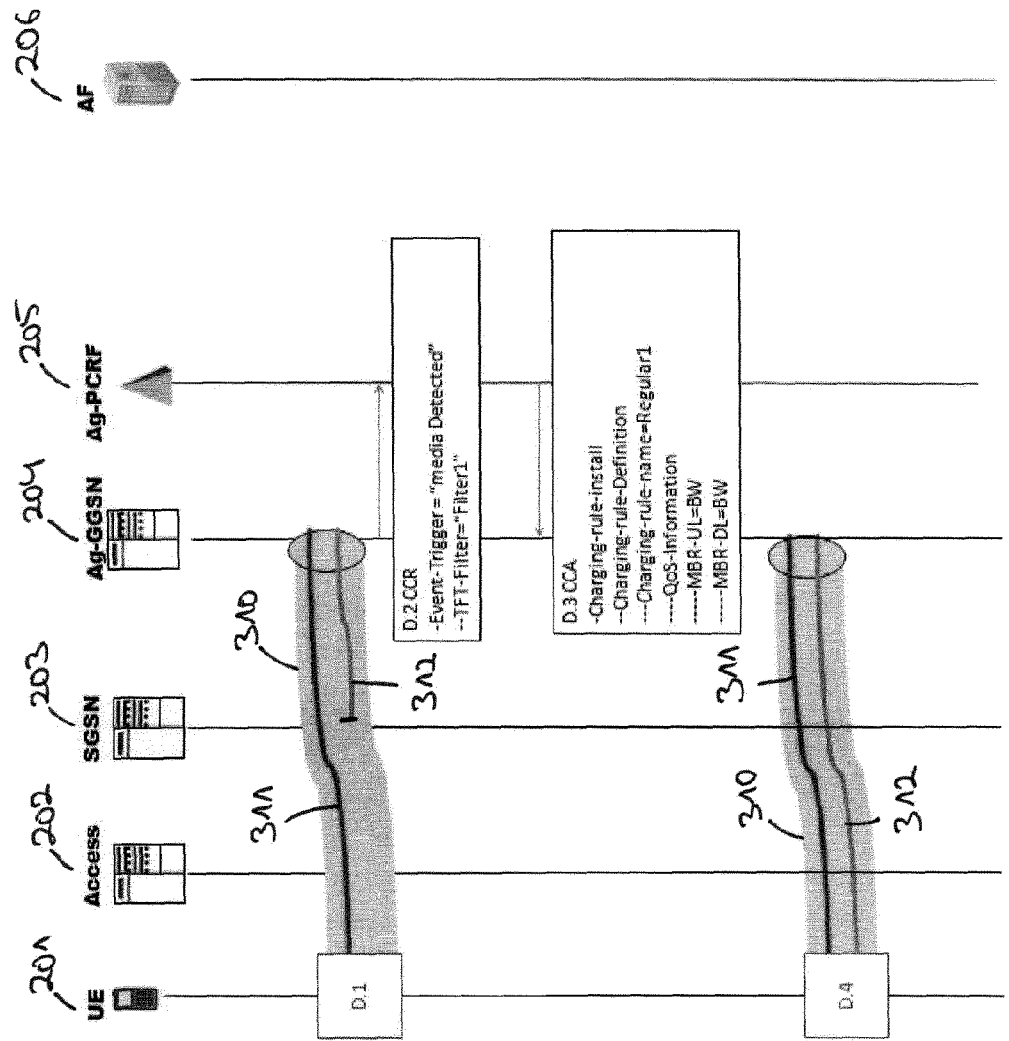
FIG. 7 illustrates an exemplary embodiment of an invocation for a context activation from a preservation mode.

FIG. 6 illustrates how the UE 201 is going into a PDP context preservation state. FIG. 7 illustrates a PDP-context activation mode from the preservation state. In FIG. 6 the flow diagram starts with the IP-CAN session 310 between the UE 201 and the Ag-PCRF 205 of FIG. 4. Box C.1 indicates that the UE 201 has the RTP data flowing on the secondary PDP context 312 and the Keep alive on the Primary PDP context 311. In flow C.2 from the Ag-GGSN 204 to the Ag-PCRF 205. Box C.2 indicates that the Ag-GGSN 204 detects that there has been silence for a long time on the secondary PDP context 312. In flow C.2 the Ag-GGSN 204 sends an indication to the Ag-PCRF 205 with an "event-trigger" comprising "Silence detected" for packet filter. In box C.3 the Ag-PCRF 205 installs the rules with MBR=0 (MBR=Maximum Bit Rate). The PCRF sends the Gx-CCA message (CCA=Credit Control Acknowledgement) to Ag-GGSN, comprising the charging-rule-install AVP with the charging-rule-name and QoS-Information (QoS=Quality of Service) comprising Max-Bit-Rate (MBR) values as 0. This acts as an indication to the network to start the bearer preservation. This starts PDP context preservation procedures at the SGSN 203. The Radio Access Bearer (RAB) is released while the secondary PDP context 312 is preserved. The keep-alive messages keep on flowing on the primary PDP context 311, due to an intelligent routing by Ag-GGSN 204. Finally, the UE 201 has one PDP context active as indicated in box C.4. The one deactivated context 312 ensures energy conservation at the UE 201. A RAB may be understood as a bearer service that an access layer provides to a non-access layer for the transfer of user data between a mobile station and a core network.

FIG. 7 illustrates an exemplary embodiment of an invocation for a context activation from a preservation mode. FIG. 7 starts with the energy conservation at the UE 201 as indicated in box C.4 of FIG. 6. The box D.1 indicates that the UE 201 is in a PDP context Preservation state. A flow from the Ag-GGSN 205 to the Ag-PCRF 205 is created and indicated as D.2. The Ag-GGSN 204 detects a media activity. The Ag-GGSN 204 invokes an event-trigger with the "media-detected" towards the Ag-PCRF 205. In box D.2 the content of the flow from the Ag-PCRF 205 to the Ag-GGSN is indicated. As a response, the Ag-PCRF 205 installs the charging rules with the relevant QoS. The content of this activation is indicated in box D.3. Afterwards, RAB channels are recreated and the media again starts to flow on the UE 201, as indicated in box D.4.

Figure 8:
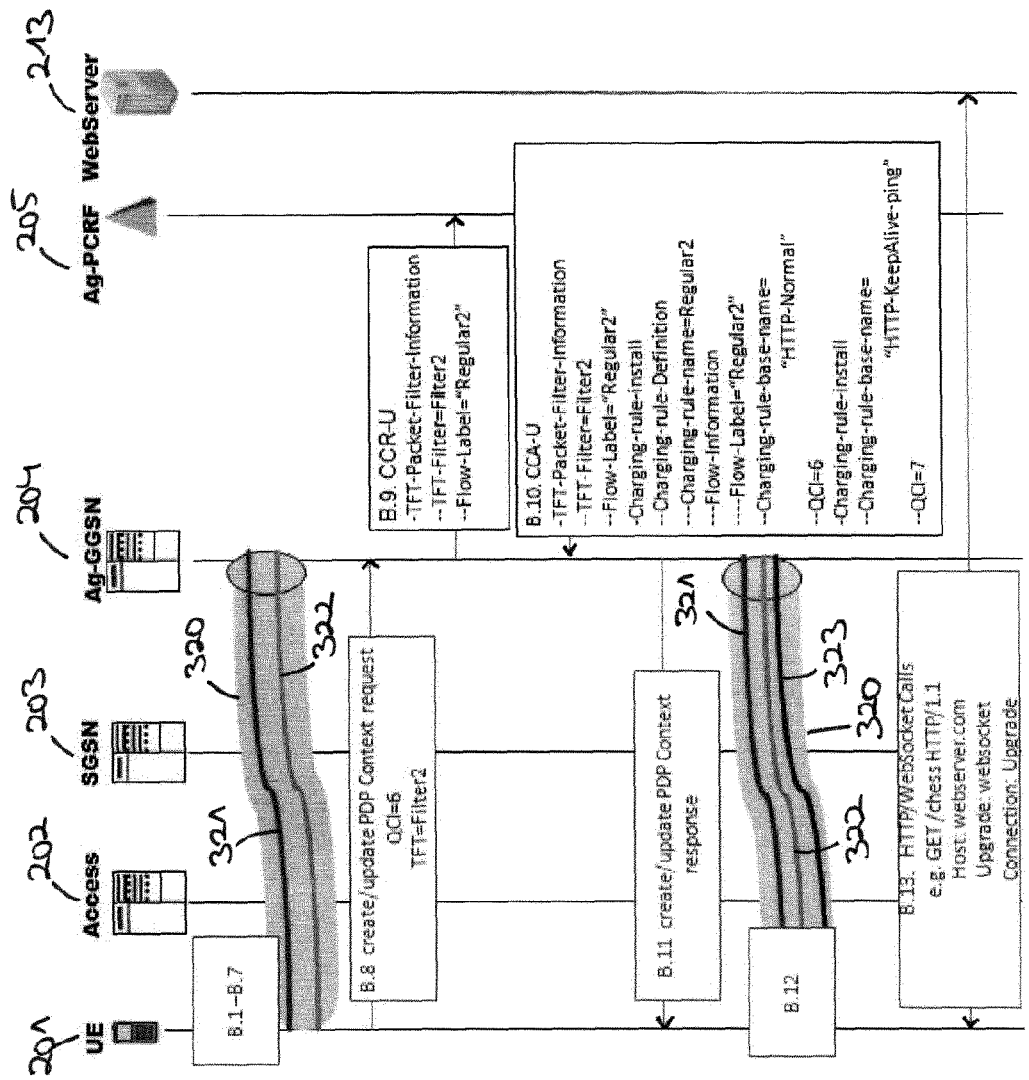
FIG. 8 illustrates an exemplary embodiment of a further secondary PDP context setup.

In FIG. 8 a secondary exemplary scenario is illustrated which is based on the architecture given in FIG. 2. In this scenario, a user is having an IP-CAN session 320 where two services 321, 322 are in use. The first service 321 is a video session, where the application level keep-alive mechanism is implemented by STUN/ICE. The second service 322 is an interactive http-web socket-based gaming session where the application level keep-alive is performed by web socket ping messages. In this example, the user is performing a gaming session with his UE 201 for playing chess on a webserver 213 connected to the UE 201.

FIG. 8 illustrates a secondary PDP context setup and flow bifurcation in a flow diagram starting with boxes B.1-B.7, which indicate a video session with segregated traffic which is setup according to the mechanisms explained and illustrated in relation to FIG. 3 and to FIG. 4. In flow B.8 the UE 201 sends a message to the Ag-GGSN 204 and selects an interactive HTTP WebSocket based application, which is indicated by box B.8: This selection starts further secondary PDP context creation procedure with further TFT, here Filter 2. The Ag-GGSN 204 sends a CCR-U message (Credit Control Request Update message) with the new filter to the Ag-PCRF 205 comprising data according to box B.9. Moreover, a response message is sent from the Ag-PCRF 205 to the Ag-GGSN 204 comprising content, which is indicated in box B.10. The Ag-PCRF 205 detects the session information, based on the TFT filter. The Ag-PCRF 205 sends the "TFT-Packet Filter Information" towards the Ag-GGSN 204 created after Bifurcating the service. In order to perform this, the Ag-PCRF 205 instructs the Ag-GGSN 204 with the pre-defined rules ("HTTP-Normal" and "HTTP-Keep-alive-ping") on a respective QCI. Moreover, the Ag-GGSN 204 allows the HTTP-Normal packets on the new secondary PDP context, while the "HTTP-Keep-alive-ping" is send on the primary PDP context. With flow of B.11 from the Ag-GGSN 204 to the UE 201 the Ag-GGSN 204 completes the secondary PDP session creation. Box B.12 indicates that the UE 201 now has three PDP contexts —one primary 321 (of QCI=7) and two secondary 322, 323 (of QCI=3 and QCI=6). The UE 201 now starts the HTTP web socket session with the webserver 213 for the interactive game as requested, which is indicated in the box between the UE 201 and the webserver 213.

Figure 9:
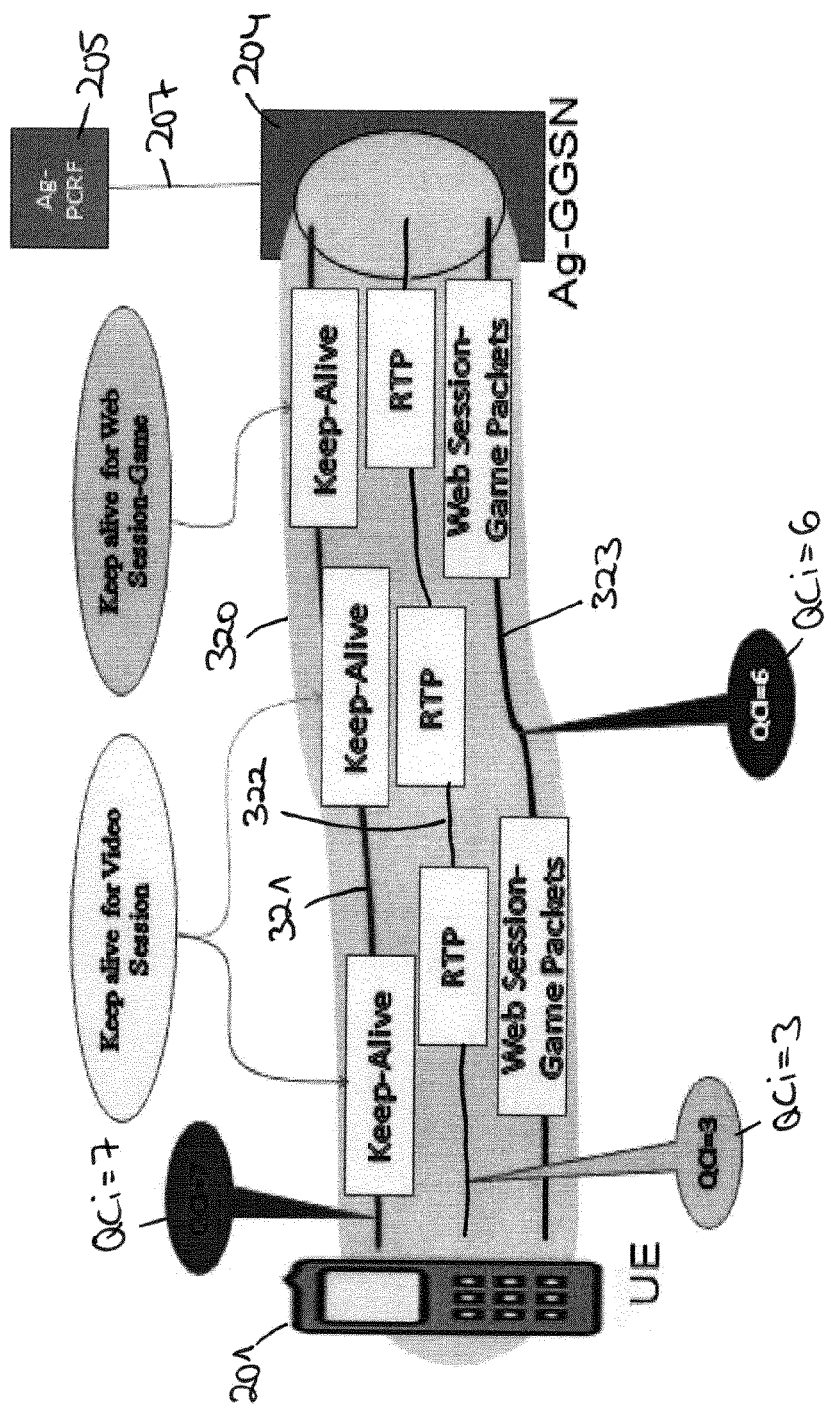
FIG. 9 illustrates an exemplary embodiment of a segregation of three different contexts.

FIG. 9 illustrates an exemplary embodiment of a segregation of three different contexts. The UE 201 is connected to the Ag-GGSN 204 in an IP-CAN session 320. The IP-CAN session 320 comprises a first PDP context 321, a second PDP context 322 and a third PDP context 223. The first PDP context 321 comprises Keep-Alive data. The second PDP context 322 comprises RTP data and the third PDP context 223 comprises a web session with game packets. A segregation of the traffic takes place for the different contexts in the IP-CAN session.

After the traffic is segregated, the Ag-PCRF 205 and Ag-GGSN 204 may invoke the energy conservation procedures by preserving the PDP contexts on which traffic is not present. This may be done for example when the user of the UE 201 is playing chess in the web session and the user is not doing his move on the chess. In order to invoke energy conservation FIG. 10 illustrates further details.

Figure 10:
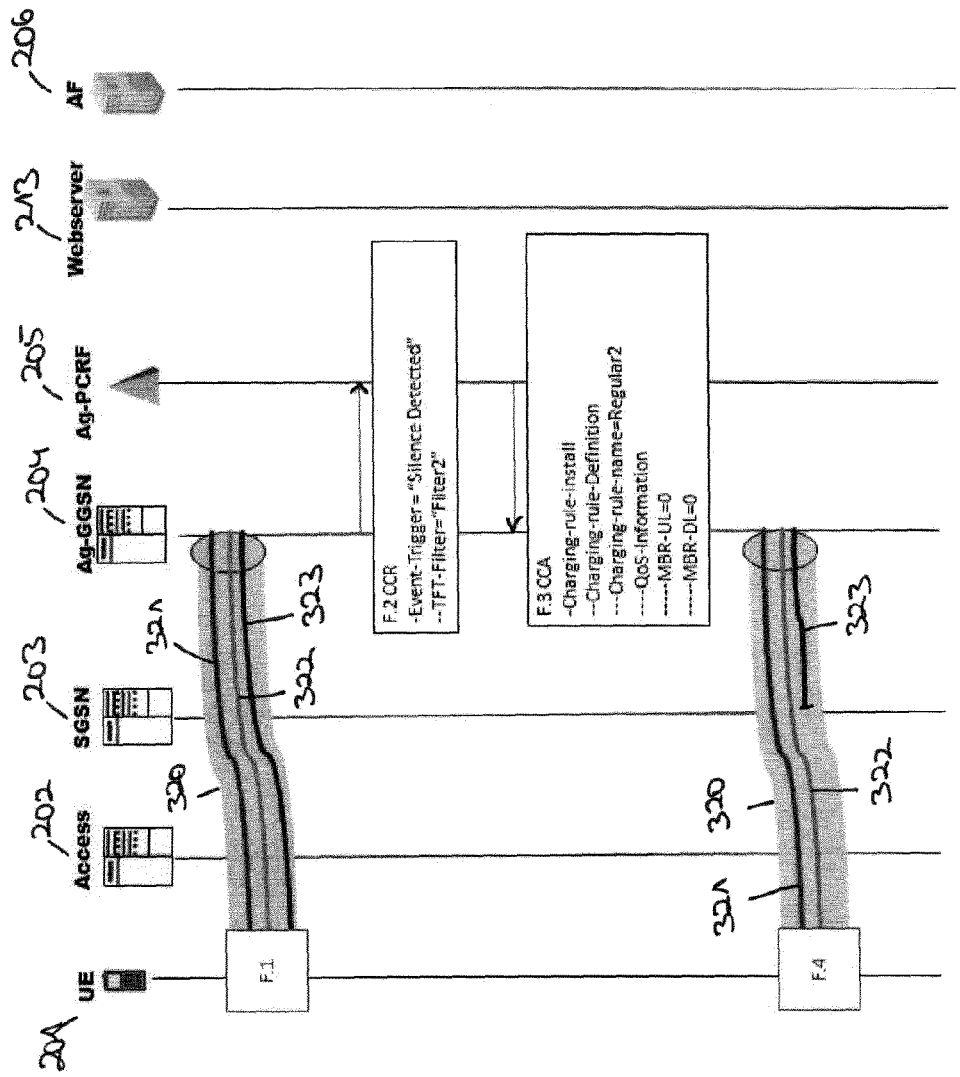
FIG. 10 illustrates an exemplary embodiment of reducing the number of active PDP from three to two.

FIG. 10 illustrates reducing the number of active PDP context from three to two on the UE 201. Box F.1 indicates that the UE 201 has the RTP data flowing on the secondary PDP context 323 and keep alive status on the primary PDP 321. The Web Socket gaming data is on another secondary PDP context 322 and the respective keep-alive (HTTP ping) is present on the primary PDP 321. The Ag-GGSN 204 detects that there has been silence for a long time on the secondary PDP context 322 using Web Socket. The Ag-GGSN 204 sends the indication to the Ag-PCRF 205 with an "event-trigger" comprising "Silence detected" for packet filter according to the content of box F.2.

As indicated with message from the Ag-PCRF to the Ag-GGSN and box F.3 the Ag-PCRF 205 installs the rules with MBR=0. This starts the PDP context preservation procedures at the Ag-SGSN 203. The RAB is released while the secondary PDP context 322 is preserved. The keep-alive (ping) messages keep on flowing on the primary PDP context 321, due to the intelligent routing by Ag-GGSN 204. Box F.4 indicates that the UE 201 has now only two PDP contexts 321, 322 active and the former PDP context 323 deactivated. Due to this deactivation the UE ensures energy conservation.

Figure 11:
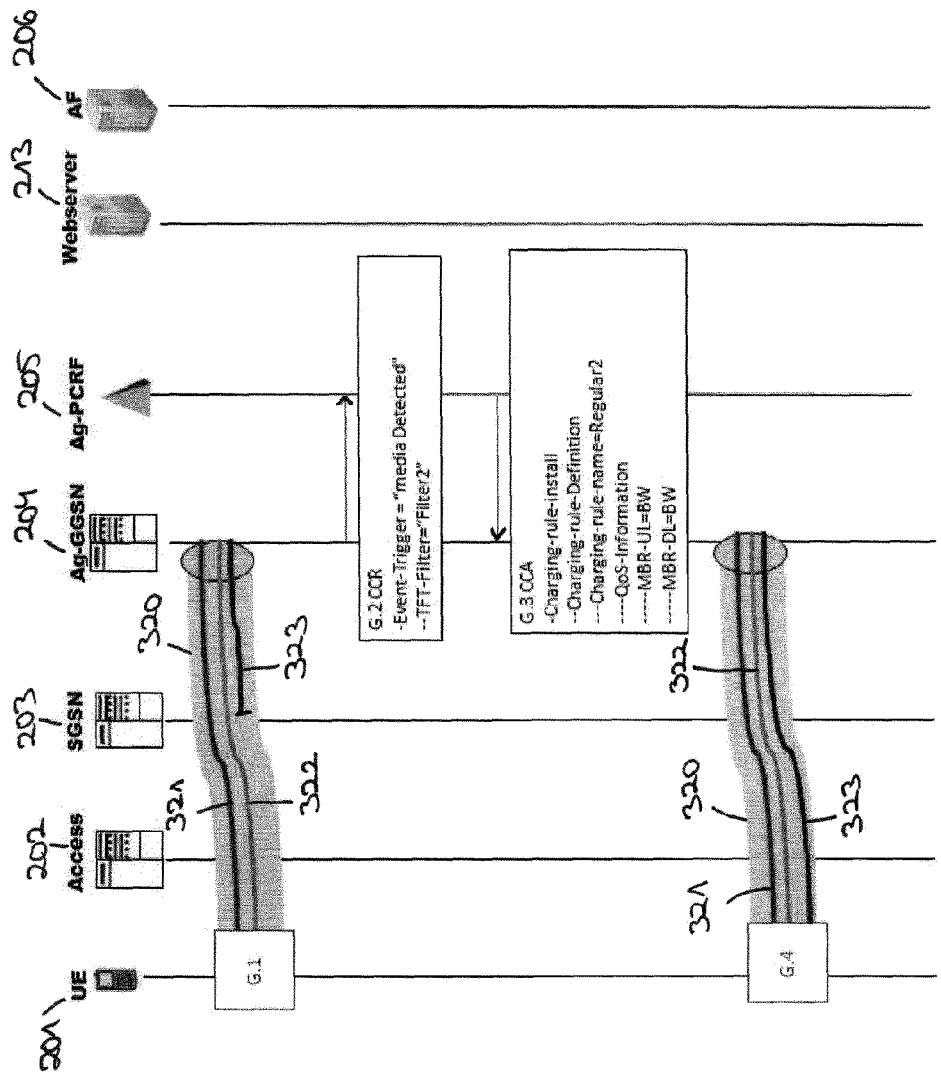
FIG. 11 illustrates exemplary embodiment of an invocation for a context activation from the preservation mode.

FIG. 11 illustrates an exemplary embodiment of an invocation for a context activation from the preservation mode. FIG. 11 starts with box G.1 indicating that the UE 201 is in a PDP context preservation state as explained in relation to FIG. 10. The Ag-GGSN 204 detects a media activity and invokes an event-trigger comprising "media-detected" towards the Ag-PCRF 205, which is indicated by box G.2. As a response message is sent towards the Ag-GGSN 204 by the Ag-PCRF 205 as indicated with flow G.3, wherein box G.3 indicates that the Ag-PCRF 205 installs the charging rules with the relevant QoS. Box G.4 indicates that the RAB channels are recreated and the media again starts to flow on the UE 201. Finally the IP-CAN session 320 comprises three PDP contexts 312, 322, 322 established between the Ag-GGSN 204 and the UE 201.

Figure 12:
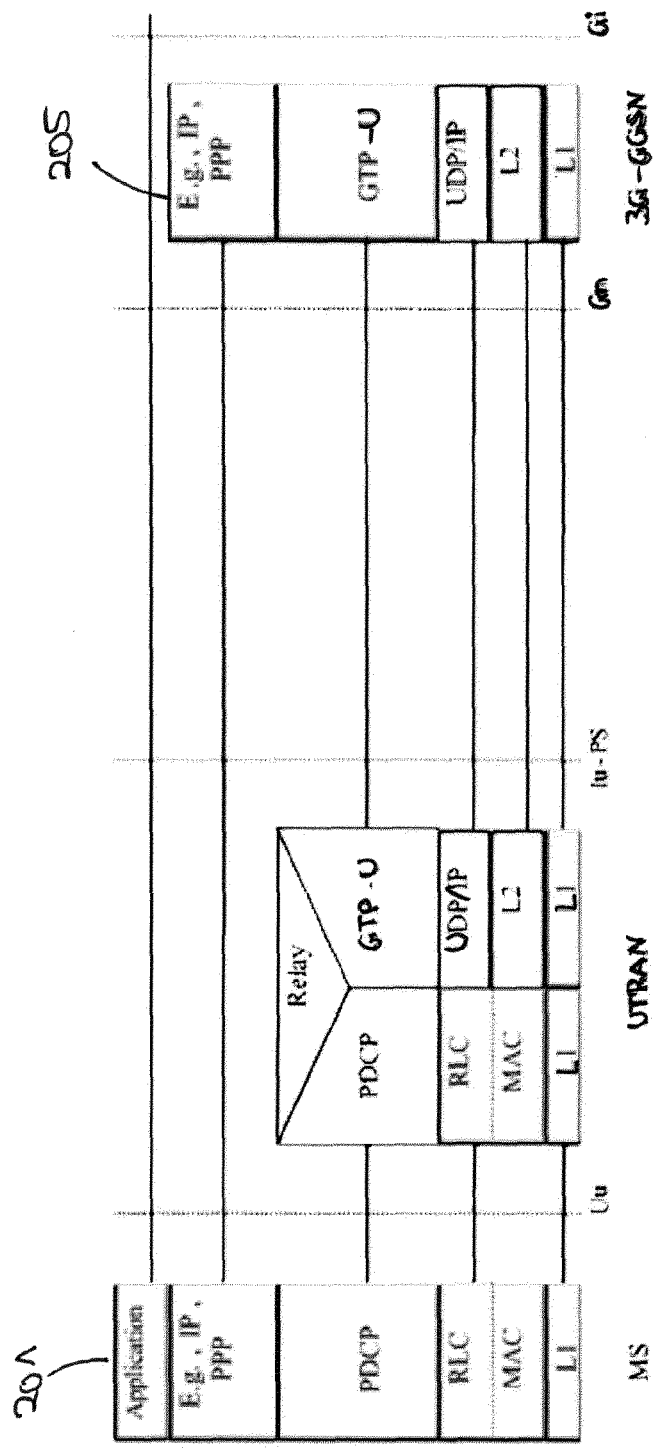
FIG. 12 illustrates an exemplary embodiment of a user plane level stack between a UE and a GGSN.

FIG. 12 illustrates an exemplary embodiment of a user plane level stack between a UE 201 and an Ag-GGSN 204. FIG. 12 shows details for the interface between these two devices 201, 204.

During a PDP context creation or a PDP context update, the Ag-PCRF 205 may pass the charging-rule-install information comprising the information about the rules, TFT and bearer to the Ag-GGSN 204. Therefore, in downlink direction, for example from the Ag-GGSN 204 to UE 201 direction, the Ag-GGSN 204 may segregate the packets based on the given rules. Hence, the packets sent between these two devices 201, 204 may have the same TFT and which may be sent on different bearers.

In relation to the uplink direction, which means the direction from the UE 201 to the Ag-GGSN 204, the following may be provided. During getting the charging-rule-install information from the Ag-PCRF 205, the Ag-GGSN 204 may set the protocol configuration operation field with media only towards the access 202. Furthermore, the Ag-GGSN 204 may send another modified message for the primary PDP context and any other bearer with the rules of protocol configuration option field with keep-alive behavior towards the access 202. Moreover, the access 202 may read the protocol configuration option provided from the core network, for example from the Ag-GGSN 204, and may store this configuration option. At the UE 201, the PDCP stack for the PDP context may use the information present in the Robust Header Compression (RoHC). For example if media like RTP is in use, then the UE 201 matches this media with the protocol configuration option provided. Therefore, at the uplink, the PDP context is able to route the required data. If this context is preserved then from the UE side, the UE 201 may be activated when there is a media flow. The further packets like keep-alive may be sent on the different bearer like on the primary PDP context.

Figure 13:
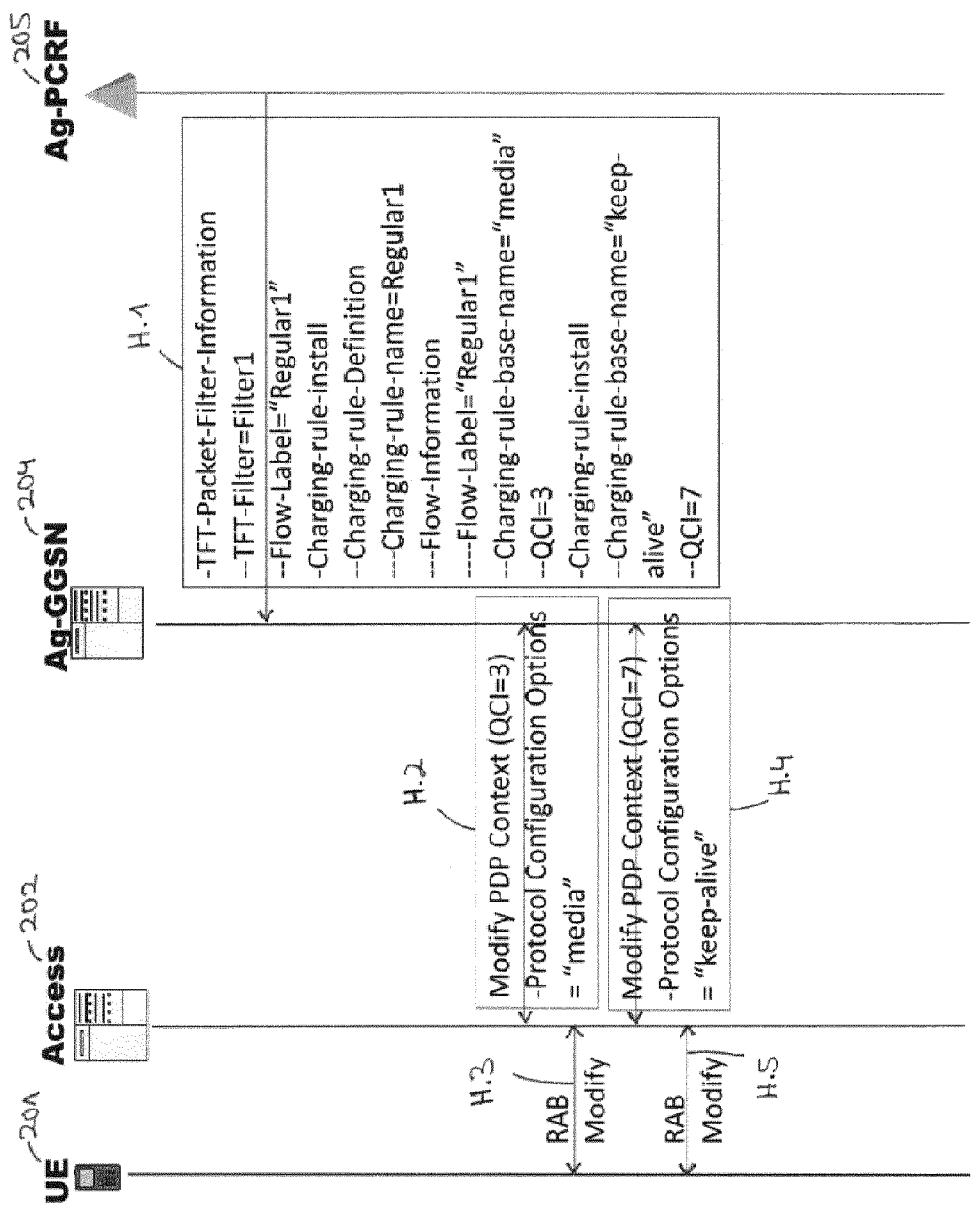
FIG. 13 illustrates an exemplary embodiment of a rule installation at a UE for an uplink data flow.
Figure 14:
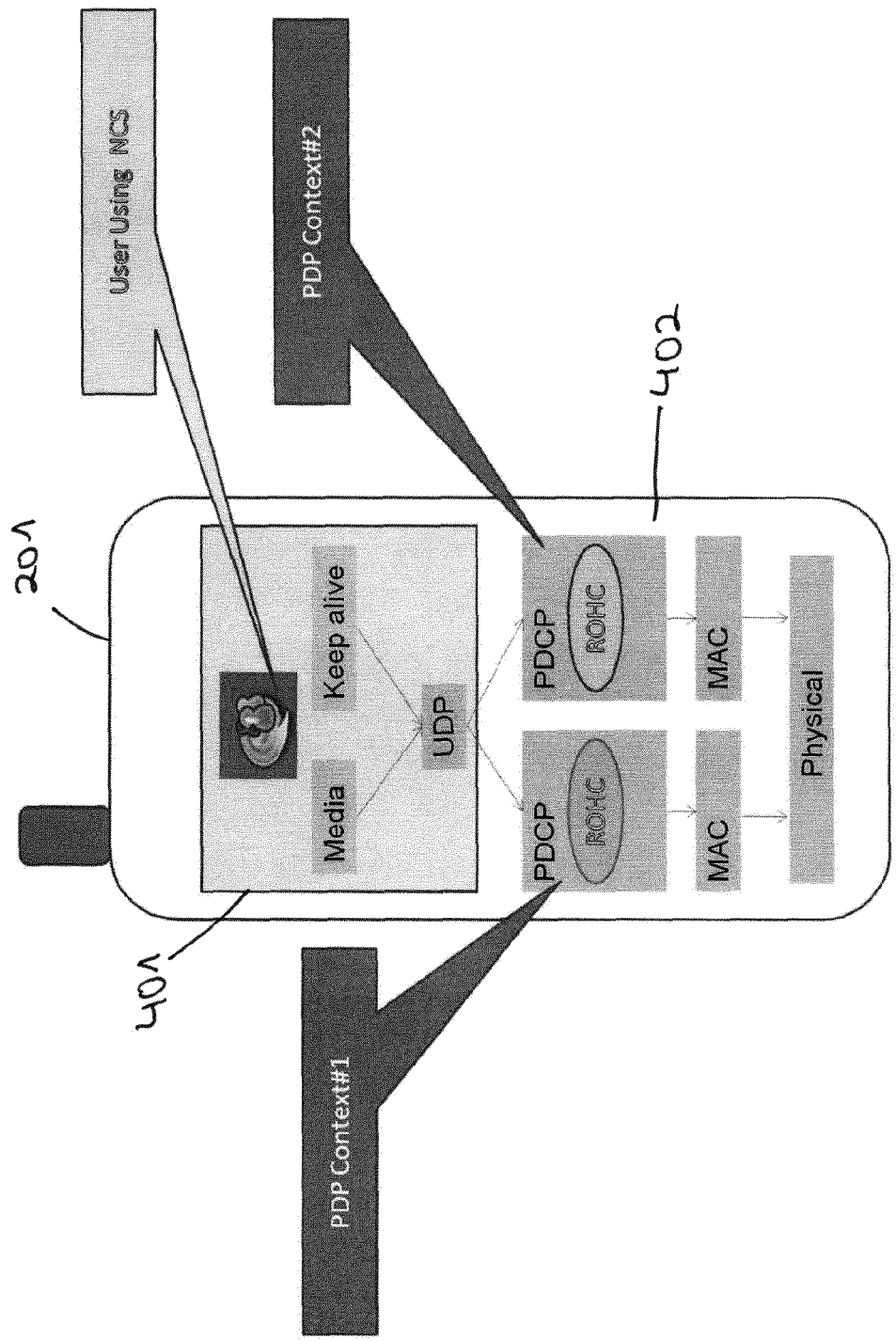
FIG. 14 illustrates an exemplary embodiment of an uplink data segregation at a UE.

FIG. 13 illustrates an exemplary embodiment of a rule installation at a UE 201 for an uplink data flow. In FIG. 14 an exemplary embodiment of a UE 201 is illustrated for the uplink data segregation as described in relation to FIG. 13.

In FIG. 13 a flow from the Ag-PCRF 205 is sent to the Ag-GGSN 204 comprising a TFT packet filter information as indicated in box H.1. Moreover, in flow H.2 from the Ag-GGSN 204 to the access 202 a modify context information is sent as indicated in box H.3. Connection H.3 indicates a RAB (Radio Access Bearer) modification procedure. Moreover, a modify PDP context information is sent from the Ag-GGSN 204 to the access 202 as indicated in H.4. In connection H.5 a further RAB modification between the access 202 and the UE 201 is indicated.

FIG. 14 illustrates an exemplary embodiment of a mobile phone as a UE 201. The user is running an application called NCS, which is displayed on a display 401 of the UE 201. There are two PDP contexts running, a first with media and a second with keep alive characteristic. The mechanisms on the UE, for example in form of software may create an uplink data segregation as indicated in the lower area 402 of the UE 201.

Figure 15:
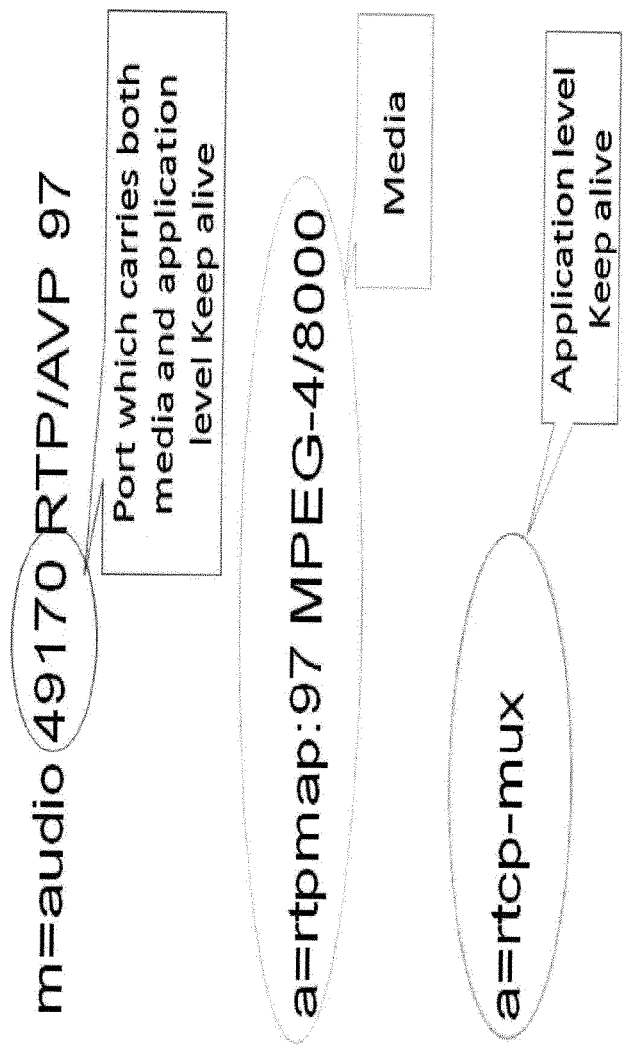
FIG. 15 illustrates an exemplary embodiment of a signaling taking place on two different bearers.

In FIG. 15 illustrates an exemplary embodiment comprising SDP signaling comprising media and application level keep alive on the same port. The port "49170" may carry both media and application keep alive packets. After segregation the media packets are separated from the application level keep alive packets.

The network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

For the purpose of the present invention as described herein above, it should be noted that:

an access technology via which signaling is transferred to and from a network element or node may be any technology by means of which a node can access an access network (e.g. via a base station or generally an access node). Any present or future technology, such as 3G or 4G, and the like may be used;

usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although described above mainly with respect to methods, procedures, an apparatus and modules thereof, it is to be understood that the present invention also covers a computer program products for implementing such methods or procedures and/or for operating such apparatuses or modules, as well as computer-readable (storage) media for storing such computer program products. The present invention also covers any conceivable combination of method steps and operations described above, and any conceivable combination of nodes, apparatuses and modules described above, as long as the above-described concepts of methodology and structural arrangement are applicable.

Furthermore, the network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

LIST OF ABBREVIATIONS

AF Application Function
Ag-GGSN Agile-Gateway GPRS Support Node
Ag-PCRF Agile-Policy Charging and Rule Function CCA Credit Control Acknowledgement
CCR Credit Control Request
CCR-U CCR-Update
DPI Deep Packet Inspection
EPC Evolved Packet Core
GBR Guaranteed Bit Rate
GGSN Gateway GPRS Support Node
Gx Interface between the policy and charging rules function (PCRF) and the evolved packet system (EPS)
HTTP Hyper Text Transfer Protocol
ICE Interactive Connectivity Establishment
IP-CAN IP Connectivity Access Network
LTE Long Term Evolution
MBR Maximum Bit Rate
PCEF Policy and Charging Enforcement function
PCRF Policy and Charging Rule Function
PDP Packet Data Protocol
P-GW Packet Gateway
QCI QoS Class Indicator
QoE Quality of user Experience
QoS Quality of Service
RAB Radio Access Bearer
RoHC Robust Header Compression
RTP Realtime Transport Protocol
Rx Interface between AF and PCRF
SGSN Serving GPRS Support Node
STUN Session Traversal Utilities for NAT
TFT Traffic Flow Template
UE User Equipment

The invention claimed is:

1. Method for controlling energy consumption comprising:
   detecting media traffic and media management traffic of a first service requested by a user device on a first bearer;
   segregating the media traffic and the media management traffic of the first bearer by creating a second bearer and transferring the media traffic or the media management traffic to the second bearer;
   observing the bearer at which the media traffic was transferred;
   detecting that the media traffic has an inactive status;
   controlling the energy consumption at the user device based on the inactive status of the media traffic;
   detecting media traffic and media management traffic of a second service on a third bearer requested by the user device; and
   segregating the media traffic and the media management traffic of the third bearer by using a further or already established bearer, where already media management traffic is present and transferring the media management traffic of this service to that bearer.

2. Method according to claim 1, the method further comprising:
   detecting that the media traffic is requested again by the user device; and
   reactivating the flow of the media traffic on the bearer where that media traffic was in an inactive status.

3. Method according to claim 1, the method further comprising detecting the first service and/or the second service within a common IP-CAN session.

4. Method according to claim 1, wherein the control of energy consumption is provided for uplink traffic.

5. Method according to claim 1, wherein the control of energy consumption is provided for downlink traffic.

6. Method according to claim 1, wherein the media management traffic comprises keep alive data.

7. Method according to claim 1, the method further comprises
   sending a trigger information in an uplink direction for indicating a silence detected.

8. Method according to claim 1, wherein the first service is provided on a primary packet data protocol context and the second service is provided on a secondary packet data protocol context.

9. Network element for controlling energy conservation comprising:
   at least one processor; and
   at least one non-transitory memory including computer program code, the at least one non-transitory memory and the computer program code configured to, with the at least one processor, cause the network element to:
   detect media traffic and media management traffic on a first bearer requested by a user device;
   segregate the media traffic and the media management traffic on the first bearer by activating a second bearer and transferring the media traffic or the media traffic to the second bearer;
   observe the bearer, where the media traffic is present;
   detect if the media traffic has an inactive status;
   control the energy consumption at the user device based on the inactive status of the media traffic;
   detect media traffic and media management traffic of a second service on a third bearer requested by the user device; and
   segregate the media traffic and the media management traffic of the third bearer by using a further or already established bearer, where already media management traffic is present and transferring the media management traffic of this service to that bearer.

10. Network element of claim 9, wherein the network element is a GGSN network element or a combination of a GGSN network element combined with a PCRF network element.

11. The network element of claim 9, wherein the at least one non-transitory memory and the computer program code are configured to, with the at least one processor, cause the network element to:
    detect that the media traffic is requested again by the user device; and
    reactivate the flow of the media traffic on the bearer where that media traffic was in an inactive status.

12. The network element of claim 9, wherein the at least one non-transitory memory and the computer program code are configured to, with the at least one processor, cause the network element to:
    detect the first service and/or the second service within a common IP-CAN session.

13. The network element of claim 9, wherein the control of energy consumption is provided for uplink traffic.

14. The network element of claim 9, wherein the control of energy consumption is provided for downlink traffic.

15. The network element of claim 9, wherein the media management traffic comprises keep alive data.

16. The network element of claim 9, wherein the at least one non-transitory memory and the computer program code are configured to, with the at least one processor, cause the network element to:
    send a trigger information in an uplink direction for indicating a silence detected.

17. The network element of claim 9, wherein the first service is provided on a primary packet data protocol context and the second service is provided on a secondary packet data protocol context.

18. User device, which is controllable in relation to energy conservation comprising
- at least one processor;
- at least one non-transitory memory including computer program code, the at least one non-transitory memory and the computer program code configured to, with the at least one processor, cause the user device to:
- receive media traffic and media management traffic on a first bearer requested by the user device;
- receive segregated media traffic and media management traffic on the first bearer and a second bearer;
- terminate a request of media traffic to have an inactive status;
- receive control parameters controlling the energy consumption at the user device based on the inactive status of the media traffic;
- request a third bearer, wherein media traffic and media management traffic of a second service is associated with the third bearer; and
- receive segregated media traffic and media management traffic on the third bearer by using a further or already established bearer, where already media management traffic is present and transferring the media management traffic of this service to the further or already established bearer.

* * * * *